(12) United States Patent
Mizuno et al.

(10) Patent No.: US 6,854,240 B2
(45) Date of Patent: Feb. 15, 2005

(54) TRIM INSERT AND TRIM

(75) Inventors: Sei-no-suke Mizuno, Tokyo (JP); Mamoru Komaba, Saitama (JP)

(73) Assignees: Nihon Ply Kabushiki Kaisha, Tokyo (JP); Sankyo Steel Kabushiki Kaisha, Saitama (JP)

(*) Notice: Subject to any disclaimer, the term of this patent is extended or adjusted under 35 U.S.C. 154(b) by 103 days.

(21) Appl. No.: 10/268,764

(22) Filed: Oct. 11, 2002

(65) Prior Publication Data

US 2003/0082337 A1 May 1, 2003

(30) Foreign Application Priority Data

Oct. 29, 2001 (JP) .......................................... 2001-330887
May 23, 2002 (JP) .......................................... 2002-149056

(51) Int. Cl.$^7$ ................................................ E04C 2/38
(52) U.S. Cl. .................. 52/716.5; 52/717.04; 428/595; 49/490.1
(58) Field of Search ............................ 52/716.5, 717.04, 52/656.8, 664, 670, 672; 428/595, 83, 122, 600; 49/490.1

(56) References Cited

U.S. PATENT DOCUMENTS

| 2,986,793 A | * | 6/1961 | Bright .......................... 24/564 |
| 4,107,898 A | * | 8/1978 | Andrzejewski et al. .... 52/716.8 |
| 5,783,312 A | * | 7/1998 | Laughman et al. .......... 428/573 |
| 6,684,574 B2 | * | 2/2004 | Hayashi ..................... 49/490.1 |

FOREIGN PATENT DOCUMENTS

JP          403204356 A   *  9/1991   ............... 52/717.04

* cited by examiner

*Primary Examiner*—Naoko Slack
(74) *Attorney, Agent, or Firm*—Rader, Fishman & Grauer, PLLC

(57) ABSTRACT

A trim insert 10 made of metal sheet in which a plurality of core pieces 11 arranged parallel to each other at regular intervals are connected together via bonded portions 12, wherein a deformed linear section 20 is formed in the lengthwise direction a of the core piece. The deformed section is a bent portion 21, a projected portion 22, 23 or a groove portion 24, and is formed all over the surface of the core pieces.

5 Claims, 18 Drawing Sheets

TRIM INSERT AND TRIM

BACKGROUND OF THE INVENTION

Field of the Invention

The present invention relates to a trim mounted to a door opening of a car, or the like, and, particularly to an improvement in a metallic trim insert embedded in the trim as a core member.

The trim is used, for example, as a shock absorber, a decorative member or a sealing member such as a weather strip attached to a door opening of a car body. A trim of this kind often has an insert of sheet metal embedded in a long molded section, of a material such as rubber or synthetic resin, to allow the trim to retain its shape.

The sheet metal insert embedded in the trim, for example the element denoted as 100 in FIG. 27, is formed of a plurality of core pieces 101 arranged parallel to each other at regular intervals and a bonding portion 102 for connecting the core pieces 101 to each other in the longitudinal direction. Alternatively, in another insert 100A (100) shown in FIG. 28, there are two bonding portions 102 and 103 for connecting the core pieces 101 to each other. As shown in FIG. 29, each of these inserts 100 and 100A is formed by a stamping process to be a flat sheet which is then fed to an extrusion molding process of a body of the trim while maintaining the flat shape and is embedded therein by a monolithic molding, after which it is bent in the widthwise direction of the trim to have a predetermined cross-sectional shape as shown, for example, in FIG. 26 and described later. At this time, the bonding portion 102 or 103 is severed and broken, if necessary, by a separator or the like.

As stated above, the insert for the trim is subjected to a monolithic molding process, together with a long molded trim section, and bent thereafter. The insert must maintain an engagement force at a position to which the trim is mounted. Accordingly, the insert for the trim must, of course, have a shape-retention ability as a core member of the bent core for the trim, as well as a rigidity, enough to resist a shearing force of the extruded material during the extrusion molding process. Generally, since the core piece 101 in the insert 100(100A) of this kind is of an elongate shape, for example, having a width in a range from 2 to 3 mm and a length (a size of the insert in the widthwise direction as a whole) in a range from 20 to 40 mm, it is necessary that the insert has a thickness to some extent; for example, sheet metal having a thickness of 0.4 to 0.5 mm is used at present.

In this connection, if the thickness of the sheet metal used for the insert is further reduced for the purpose of decreasing a weight or cost of the molded trim, or effectively using material resources, there is a risk not only that the shape-retention ability as the core member becomes insufficient, but also that the rigidity is lowered, whereby the core pieces are deformed by the pressure of a resin during the monolithic molding of the trim to disturb the parallel arrangement of the core pieces and deteriorate the function of the insert. Therefore, there was a problem in that the thickness of the metal sheet could not be further reduced. However, the reduction of thickness of the insert results in many merits; such as the lowering of the material cost, the reduction of a weight of parts, as well as the effective use of material resources.

The present invention proposes a novel insert for a trim improved mainly in functions such as rigidity or strength in view of the above-mentioned problems. Thereby, a novel insert for a trim, and a novel trim using the same, capable of reducing a thickness thereof without any deterioration of the function of the insert, lowering the material cost, decreasing a weight of parts as well as effectively using material resources, are provided. Also, the present invention proposes a structure of an insert for a trim capable of adjusting the rigidity or the strength of core pieces if necessary.

SUMMARY OF THE INVENTION

That is, the present invention defined by claim 1 is a trim insert made of metal sheet in which a plurality of core pieces arranged parallel to each other at regular intervals are connected together via bonded portions, characterized in that a deformed linear section is formed in the lengthwise direction of the core piece.

The present invention defined by claim 2 is a trim insert defined by claim 1, wherein the deformed section is a bent portion, a projected portion or a groove portion.

The present invention defined by claim 3 is a trim insert defined by claim 1, wherein the deformed section is formed all over the surface of the core pieces.

The present invention defined by claim 4 is a trim insert defined by claim 1, wherein the deformed section is formed in part of the core piece.

The present invention defined by claim 5 is a trim insert defined by claim 1, wherein a plurality of deformed sections are formed in one core piece.

The present invention defined by claim 6 is a trim insert defined by claim 5, wherein the plurality of deformed sections are partially formed in one core piece.

The present invention defined by claim 7 is a trim insert defined by claim 1, wherein the deformed section is formed in each of the core pieces.

The present invention defined by claim 8 is a trim insert defined by claim 1, wherein a predetermined number of deformed sections are formed in the core piece.

The present invention defined by claim 9 is a trim insert defined by claim 1, wherein a deformed reinforcement section linearly continuous in the lengthwise direction of the insert is formed at a position of the bonded portion.

The present invention defined by claim 10 is a trim insert defined by claim 9, wherein the deformed reinforcement section is formed to cross the core piece.

The present invention defined by claim 11 is a trim in which an insert of metal sheet formed of a plurality of core pieces arranged parallel to each other at a pitch and connected to each other via bonded portions are embedded in a main body of rubber or synthetic resin, characterized in that the trim insert has a deformed linear section in the lengthwise direction of the core piece, and in that the trim insert is bent in accordance with the shape of the trim body in the core piece.

DESCRIPTION OF THE PREFERRED EMBODIMENTS

The present invention will be described in detail, below, with reference to the attached drawings.

Figure 1:
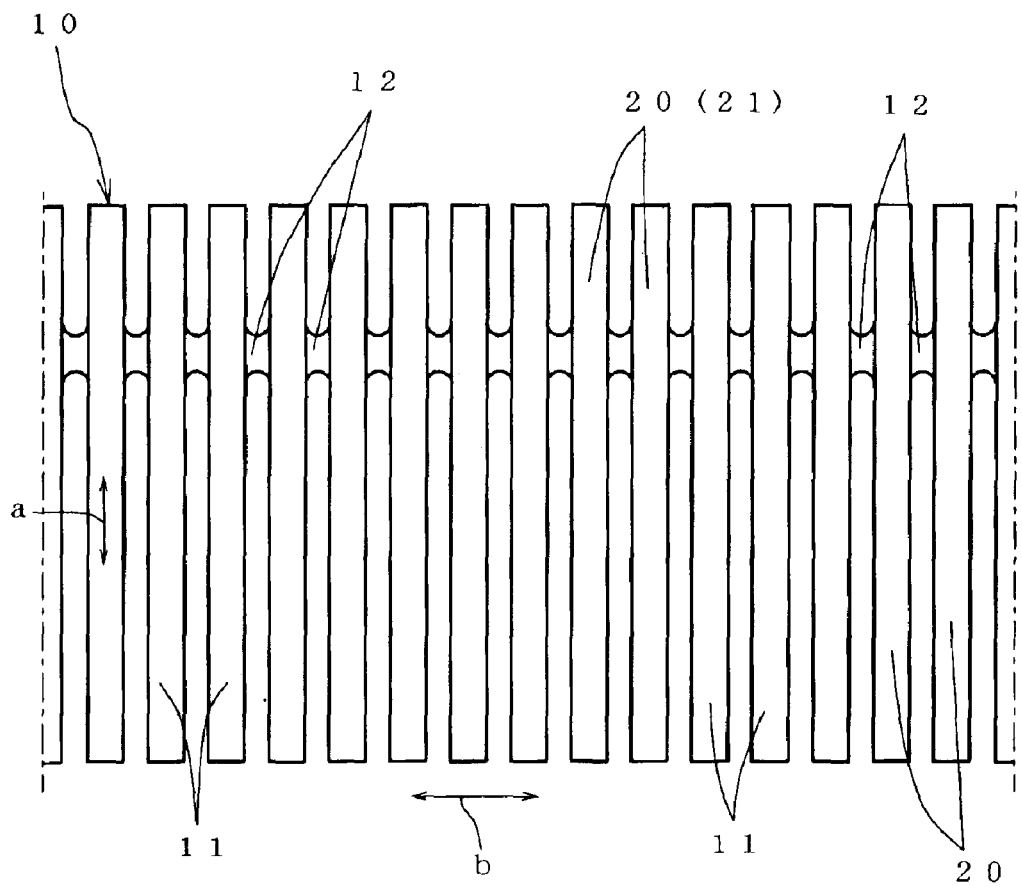
FIG. 1 is a plan view of a part of a trim insert according to one embodiment of the present invention.
Figure 2:
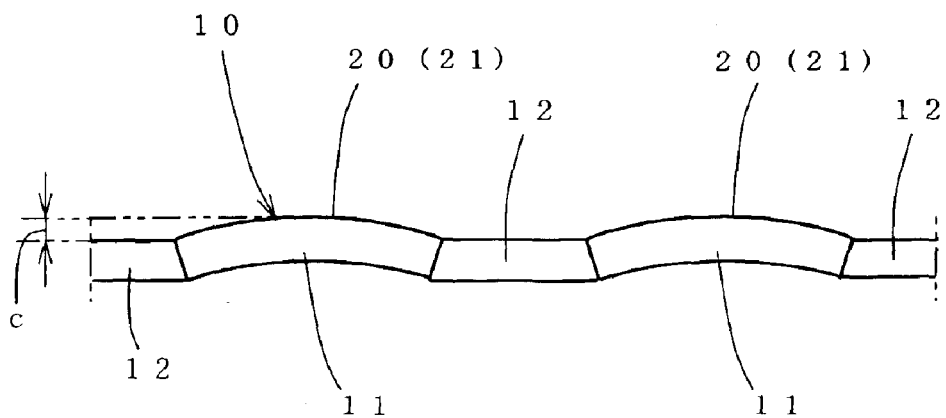
FIG. 2 is an enlarged front view of the trim insert shown in FIG. 1.
Figure 3:
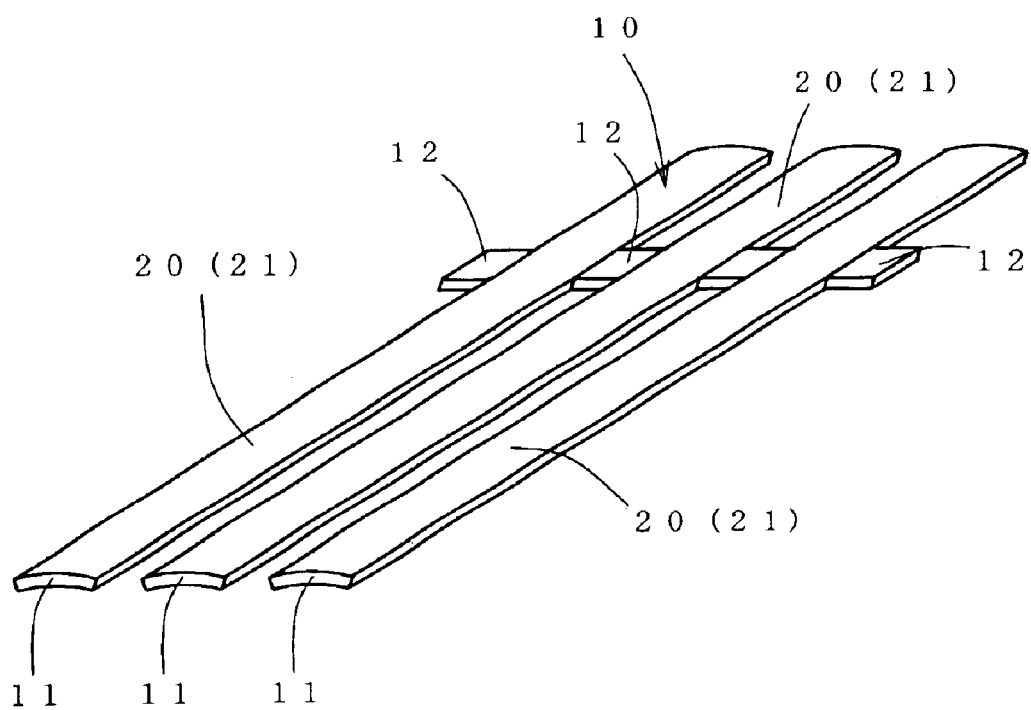
FIG. 3 is a perspective view of part of the trim insert of FIG. 1.
Figure 4:
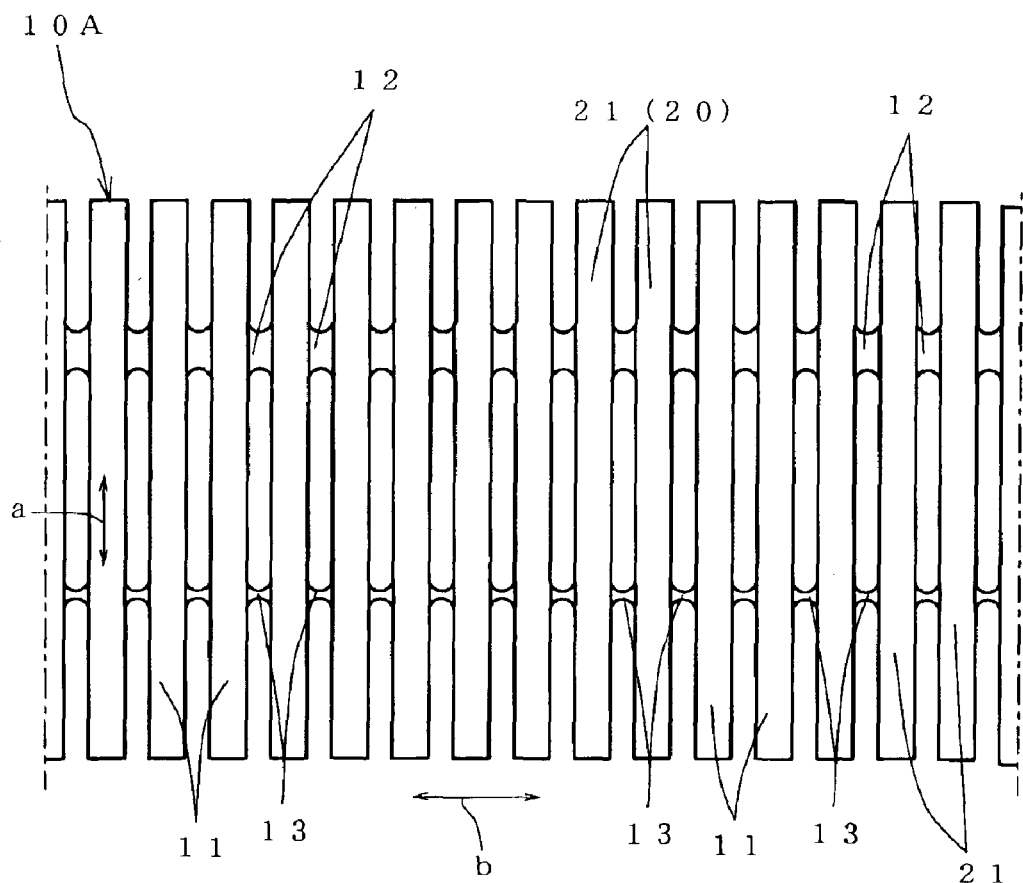
FIG. 4 is a plan view of another embodiment of the trim insert.
Figure 5:
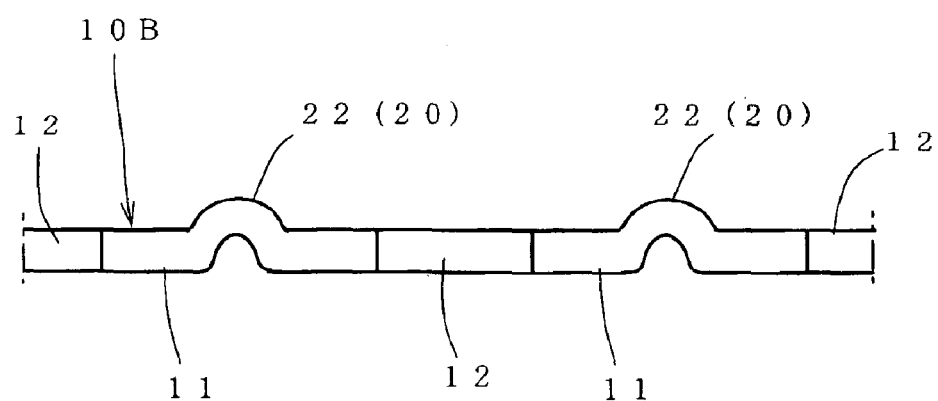
FIG. 5 is an enlarged front view of part of a deformed section in the trim insert.
Figure 6:
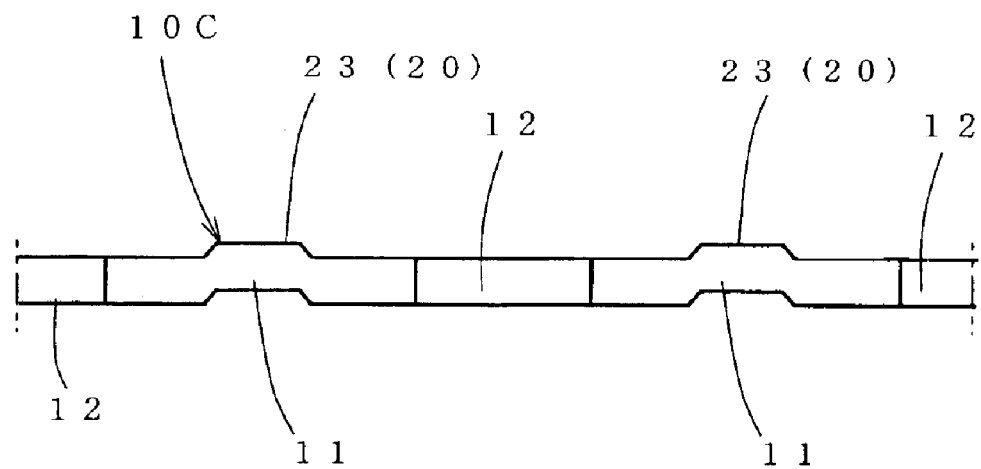
FIG. 6 is an enlarged front view of part of another deformed section of the trim insert.
Figure 7:
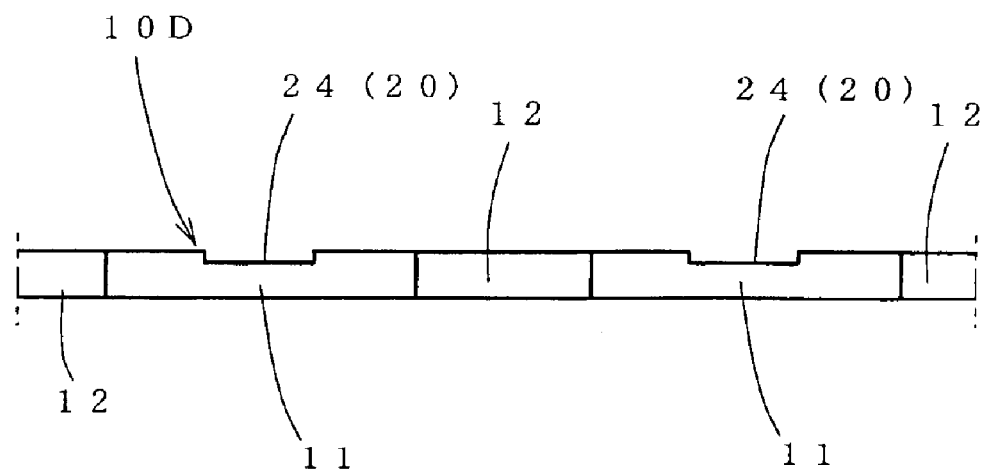
FIG. 7 is an enlarged front view of part of a further deformed section of the trim insert.
Figure 8:
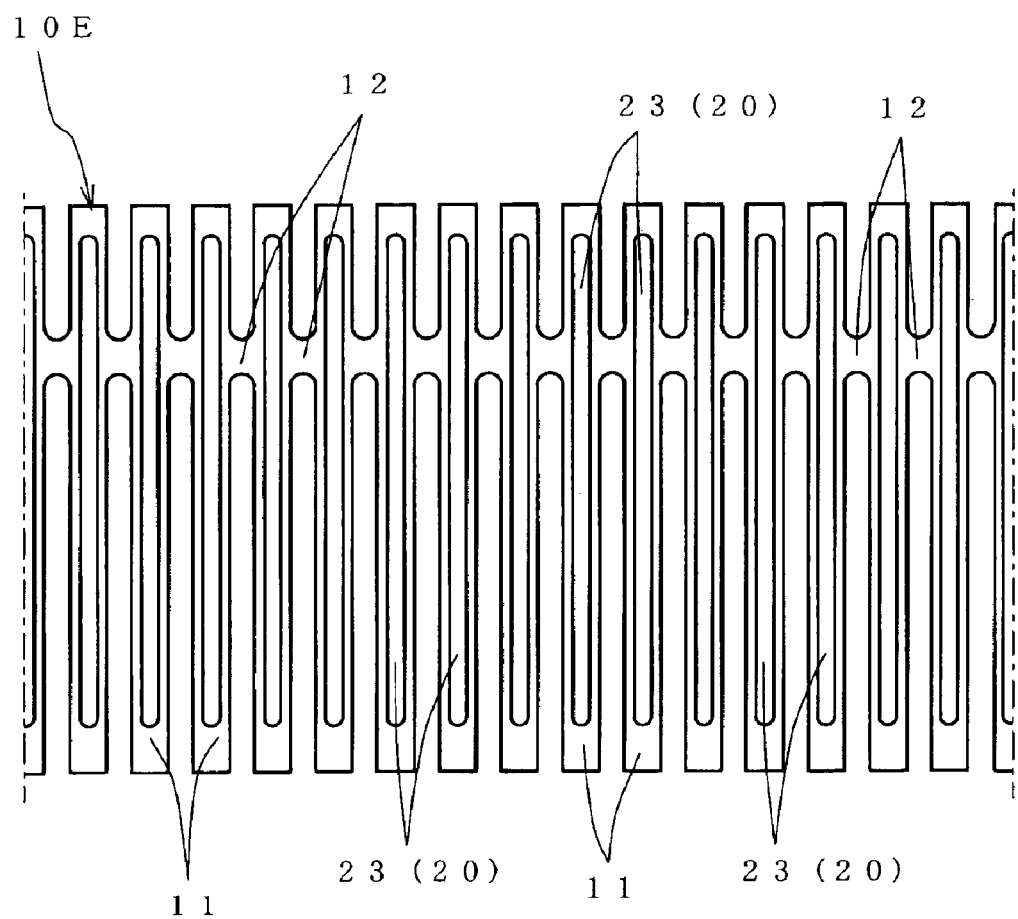
FIG. 8 is a plan view of part of one embodiment of the trim insert in which a deformed section is formed in a core piece.
Figure 9:
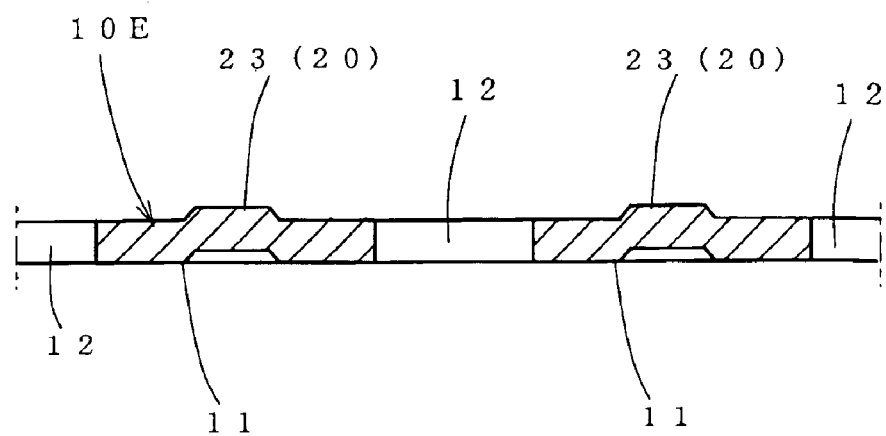
FIG. 9 is an enlarged sectional view illustrating a deformed section of FIG. 8.
Figure 10:
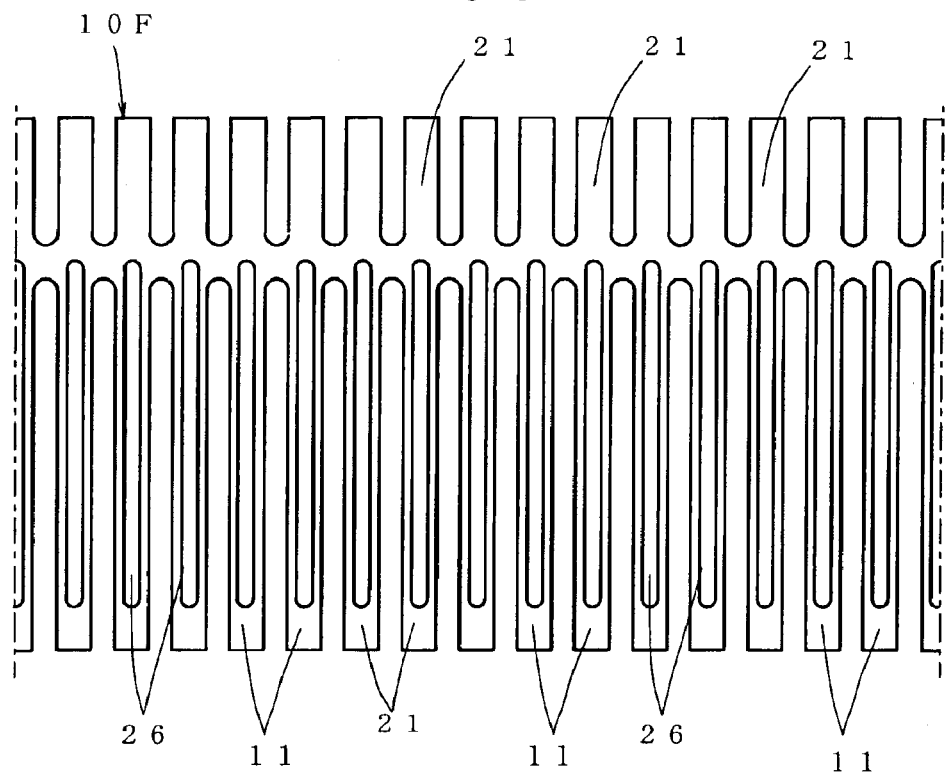
FIG. 10 is a plan view of part of a trim insert in which a plurality of deformed sections are formed in every core piece.
Figure 11:
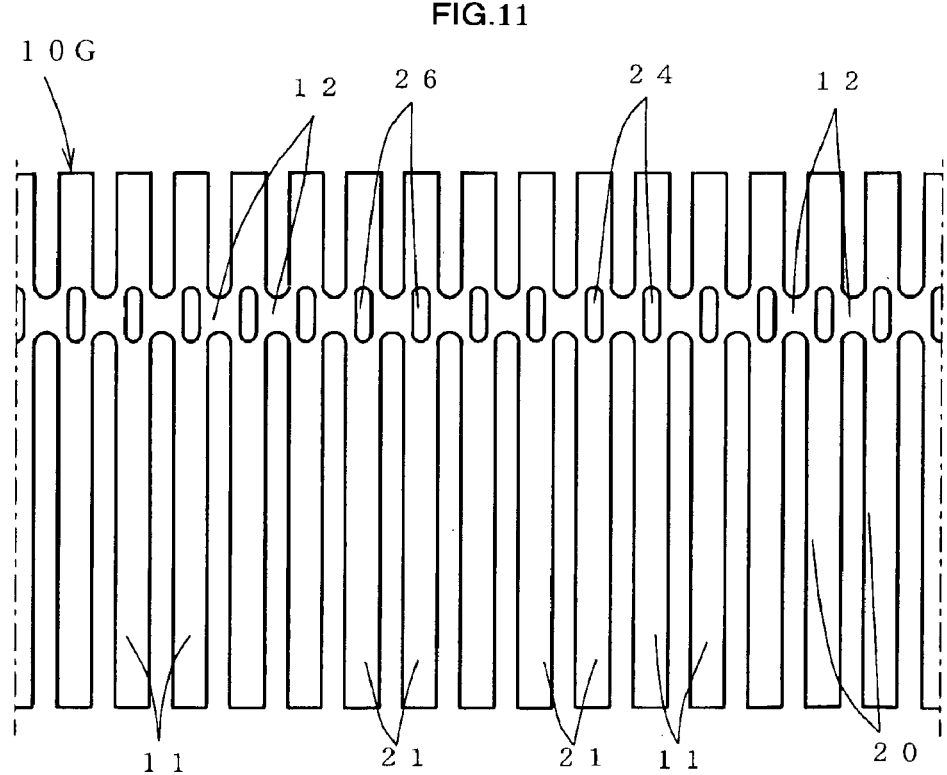
FIG. 11 is a plan view of part of a trim insert showing another embodiment in which a plurality of deformed sections are formed in every core piece.
Figure 12:
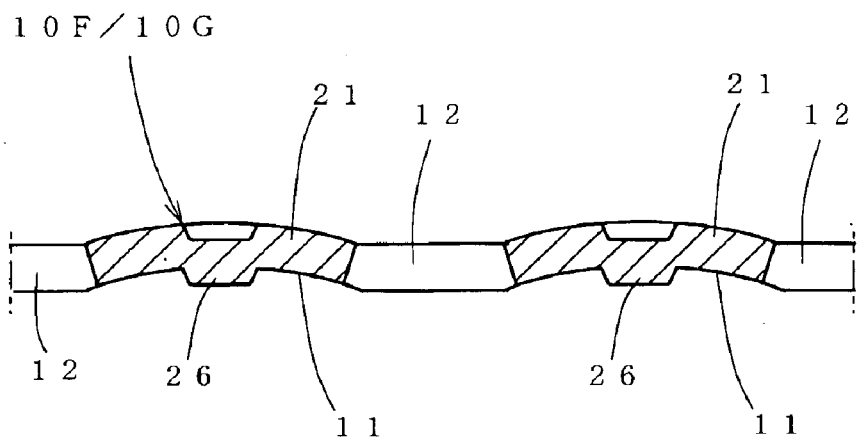
FIG. 12 is an enlarged sectional view of part of the trim insert shown in FIGS. 10 and 11.
Figure 13:
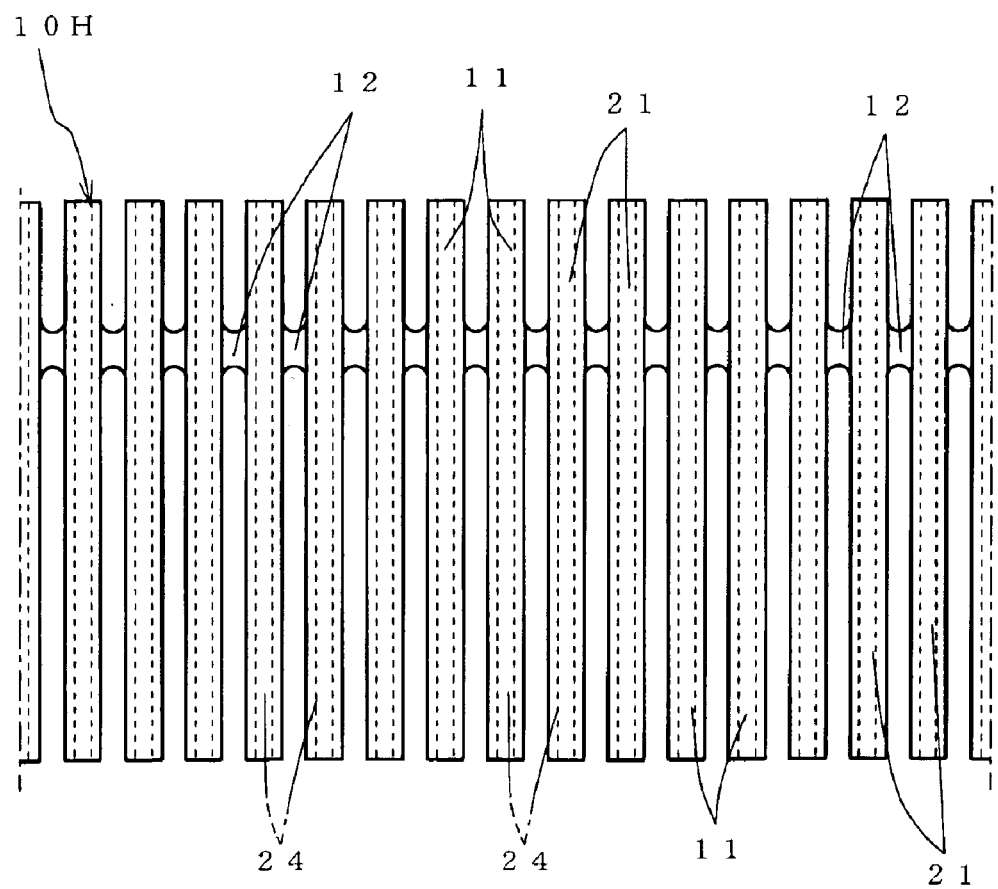
FIG. 13 is a plan view of part of a trim insert in which a plurality of deformed sections are formed in every core piece.
Figure 14:
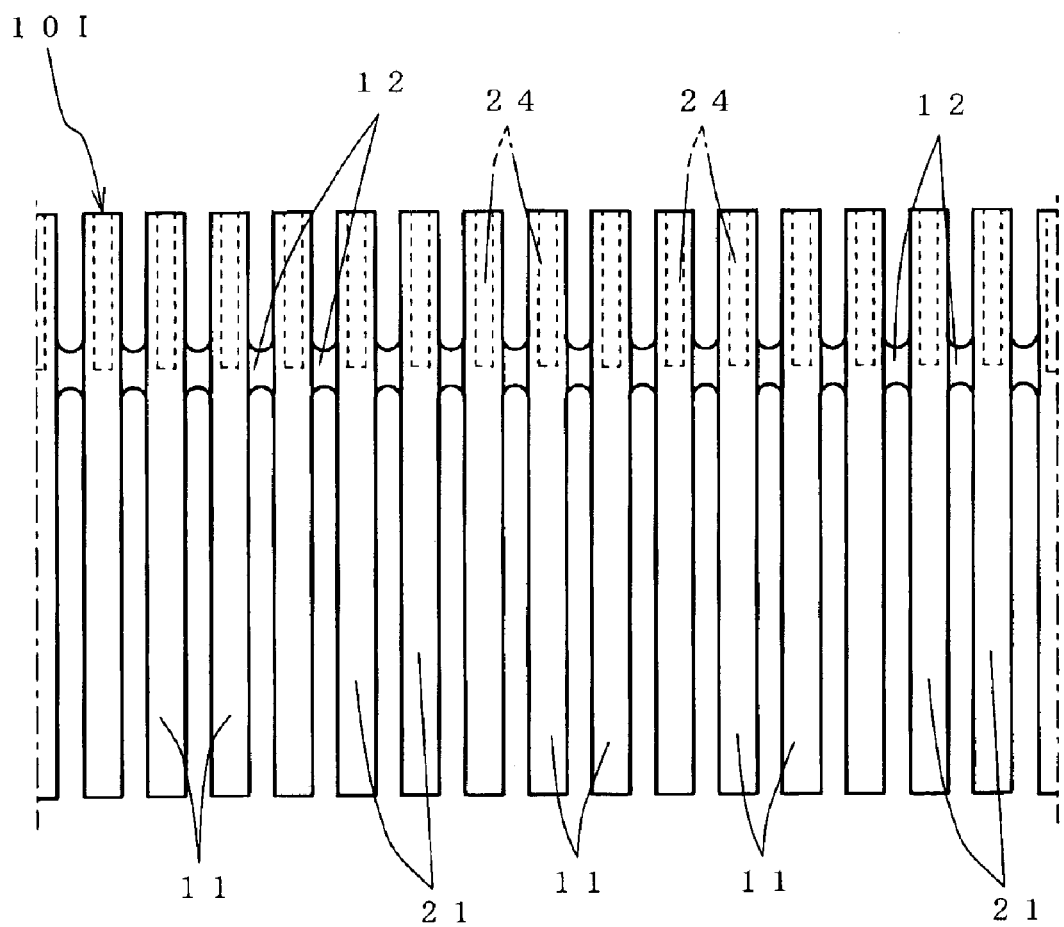
FIG. 14 is a plan view of part of another trim insert in which a plurality of deformed sections are formed in every core piece.
Figure 15:
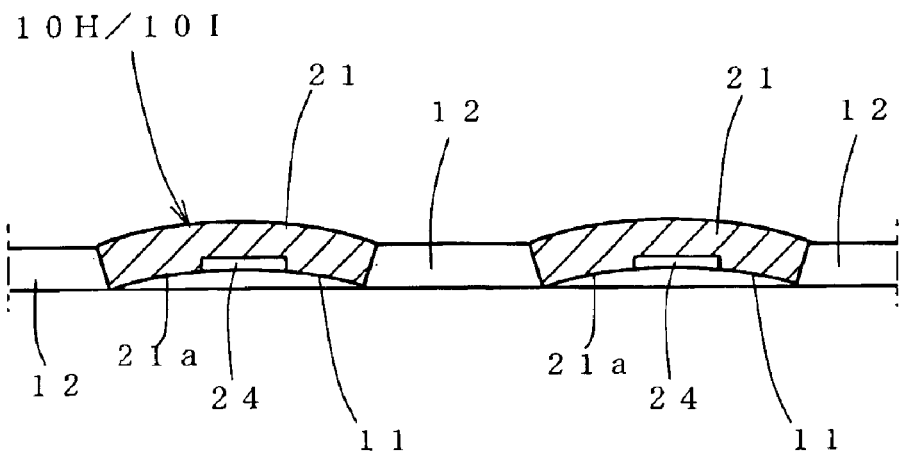
FIG. 15 is an enlarged sectional view of part of the deformed section shown in FIGS. 13 and 14.
Figure 16:
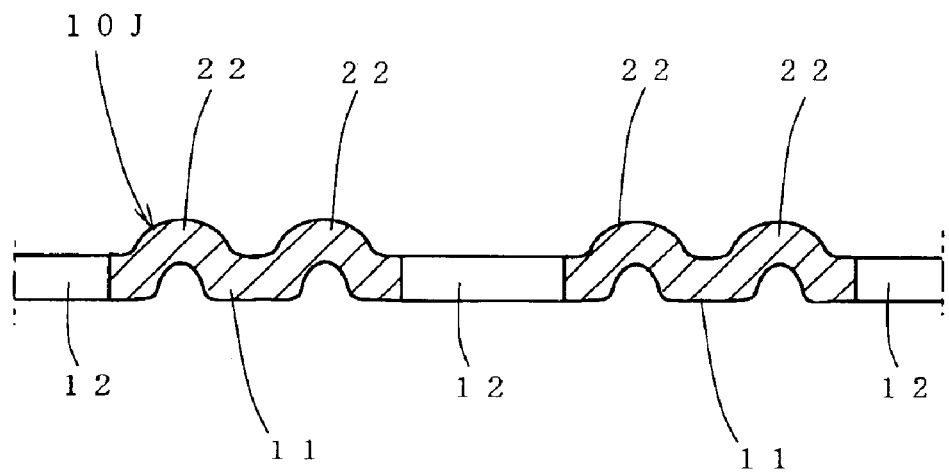
FIG. 16 is a sectional view of part of another trim insert in which a plurality of deformed sections are formed in every core piece.
Figure 17:
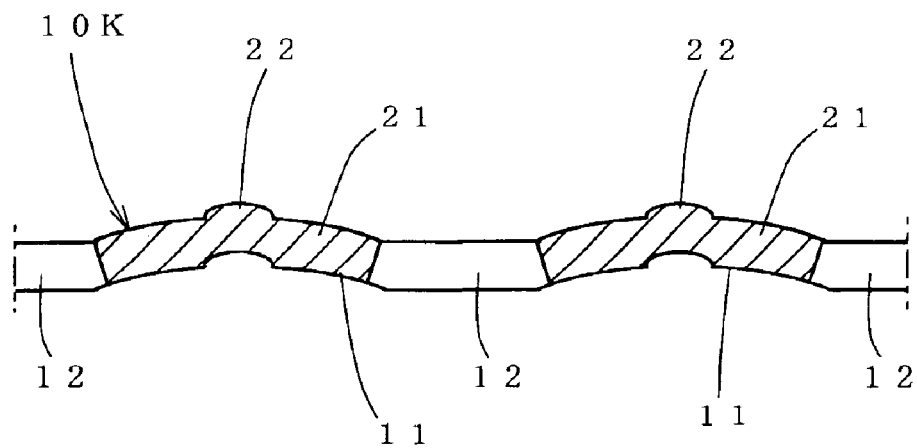
FIG. 17 is a sectional view of part of another trim insert in which a plurality of deformed sections are formed in every core piece.
Figure 18:
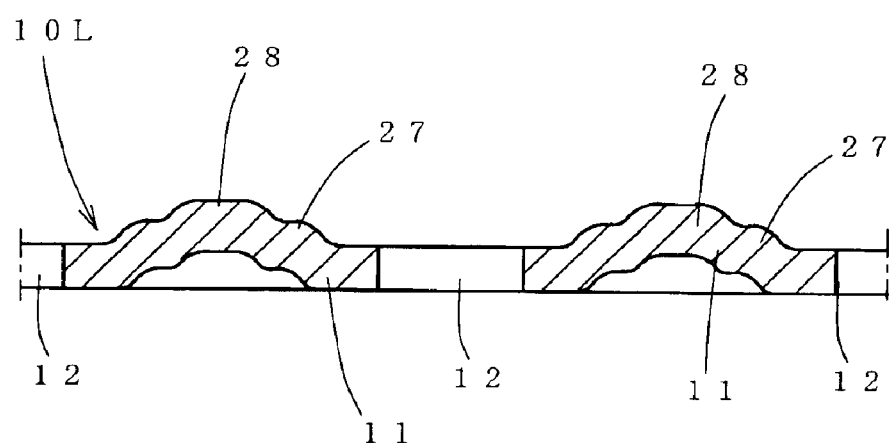
FIG. 18 is a sectional view of part of another trim insert in which a plurality of deformed sections are formed in every core piece.
Figure 19:
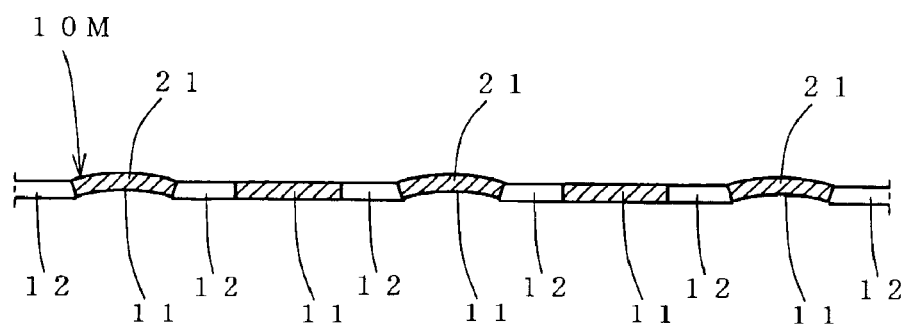
FIG. 19 is a sectional view of part of a trim insert in which a deformed section is formed in a core piece positioned at a predetermined number of the core pieces.
Figure 20:
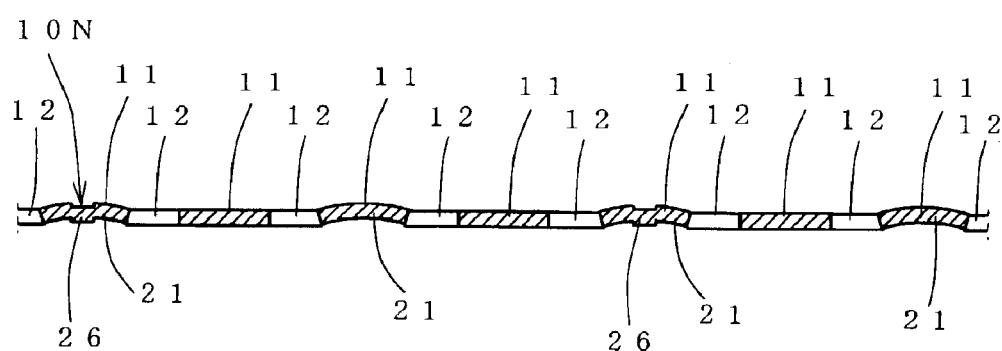
FIG. 20 is a sectional view of part of another trim insert in which a deformed section is formed in a core piece positioned at a predetermined number of the core pieces.
Figure 21:
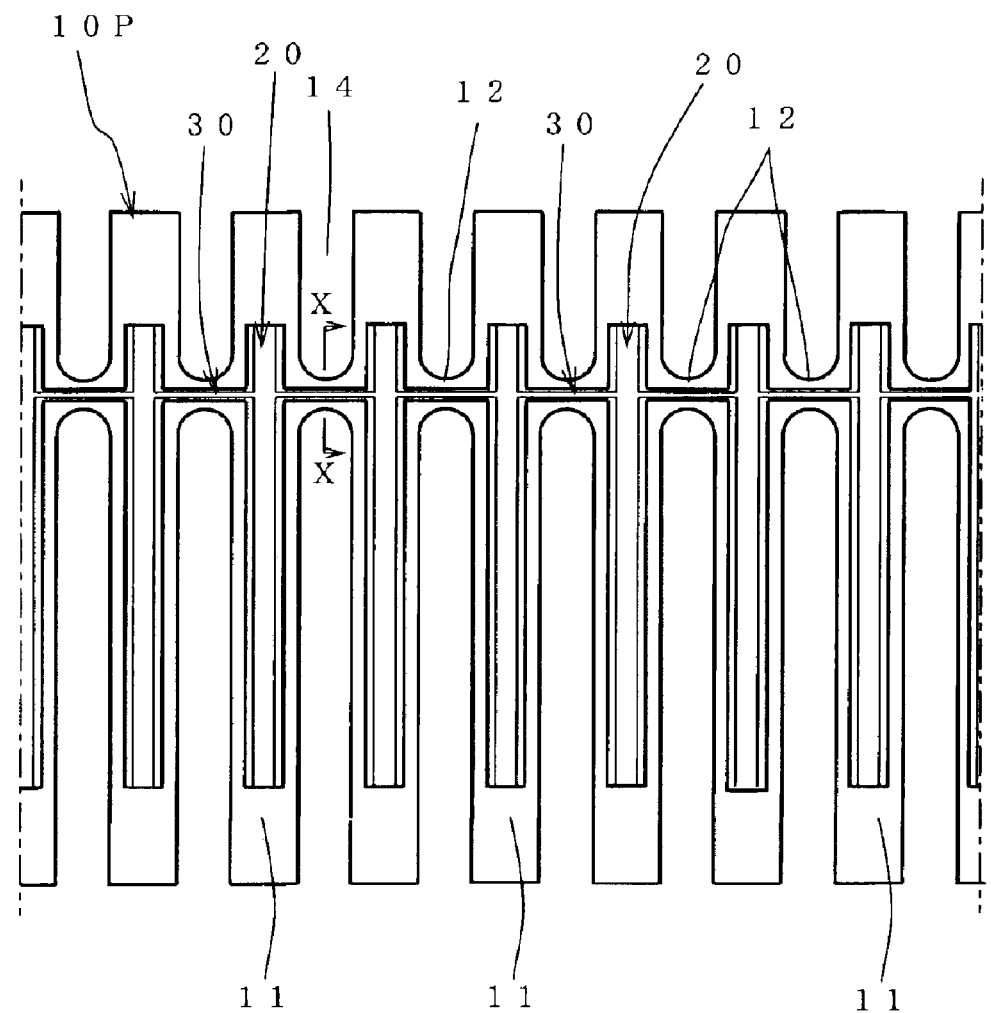
FIG. 21 is a plan view of a trim insert in which a deformed reinforcement section is formed in the lengthwise direction thereof.
Figure 22:
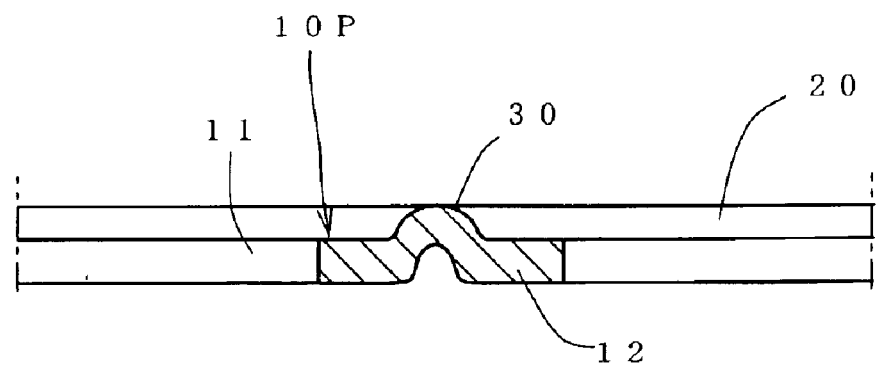
FIG. 22 is a sectional view taken along X—X line in FIG. 21.
Figure 23:
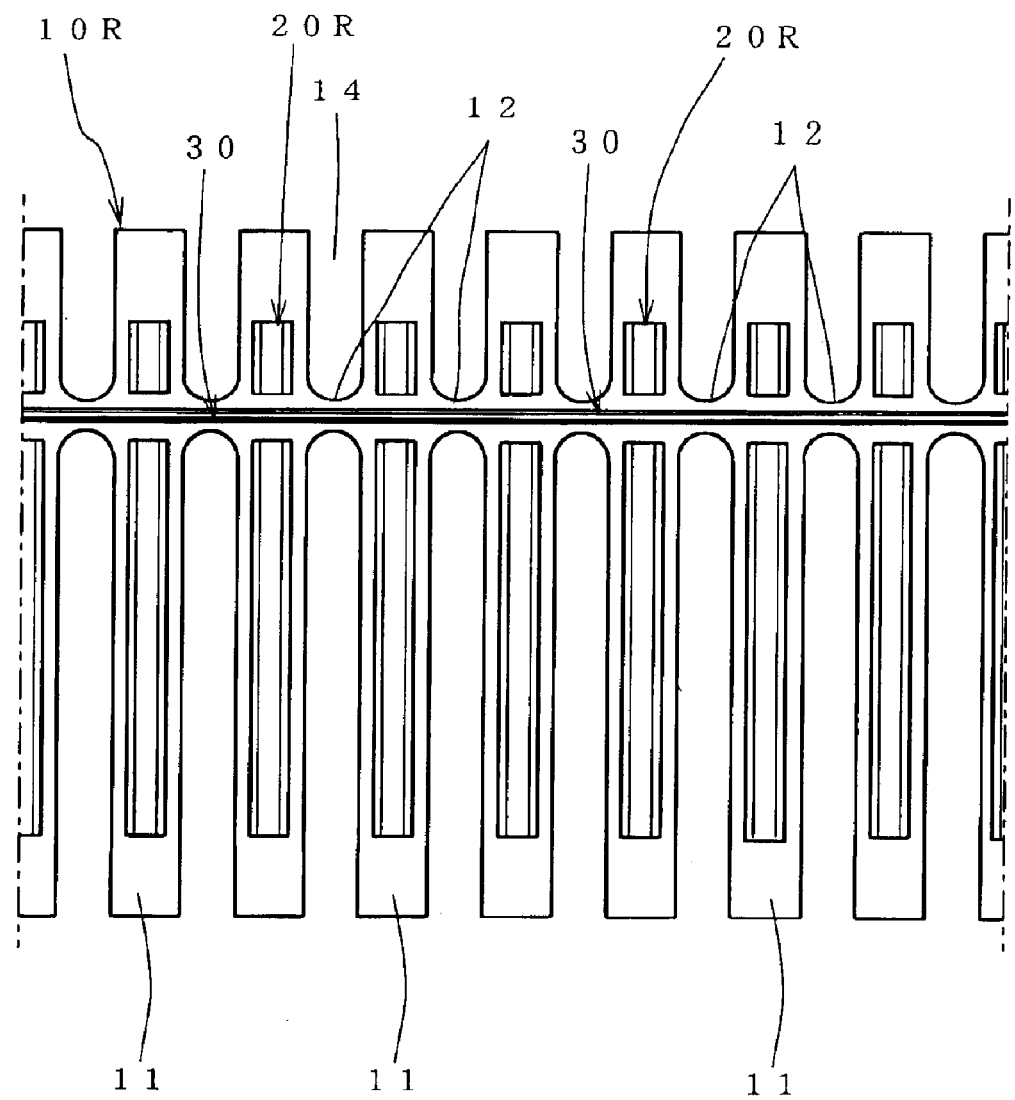
FIG. 23 is a plan view illustrating another embodiment of a trim insert in which deformed reinforcement sections are formed.
Figure 24:
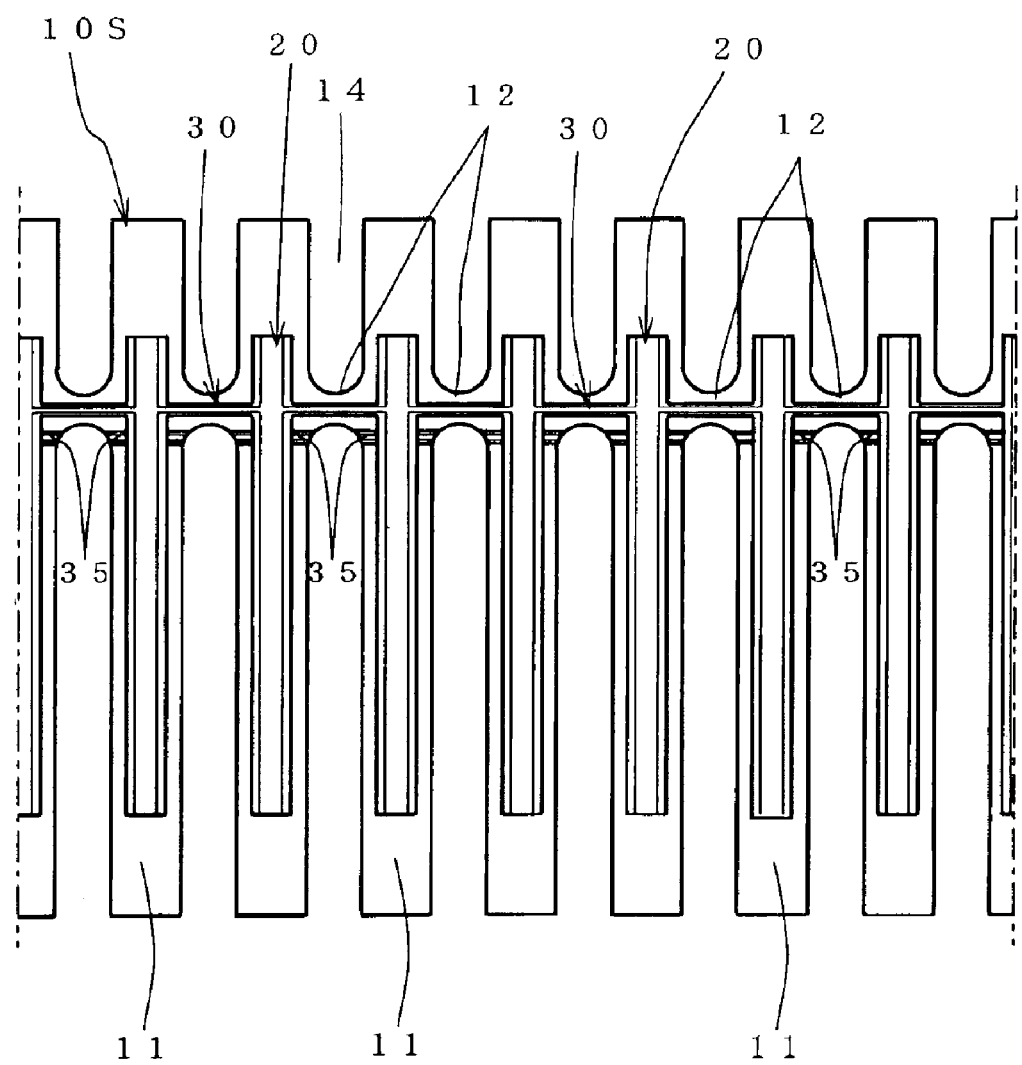
FIG. 24 is a plan view illustrating another embodiment of a trim insert in which deformed reinforcement sections are formed.
Figure 25:
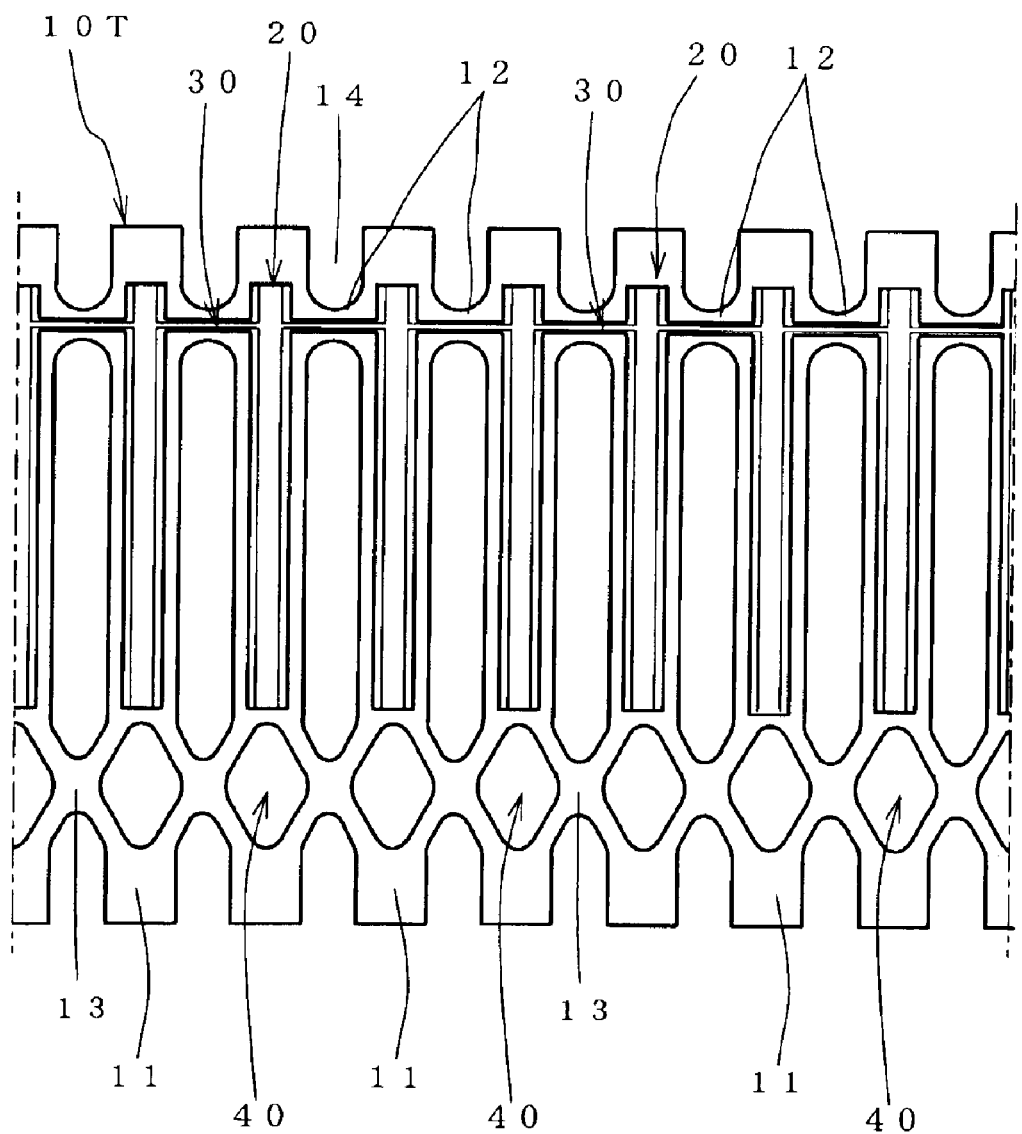
FIG. 25 is a plan view illustrating an embodiment of a trim insert in which deformed reinforcement sections as well as opening portions are formed.
Figure 26:
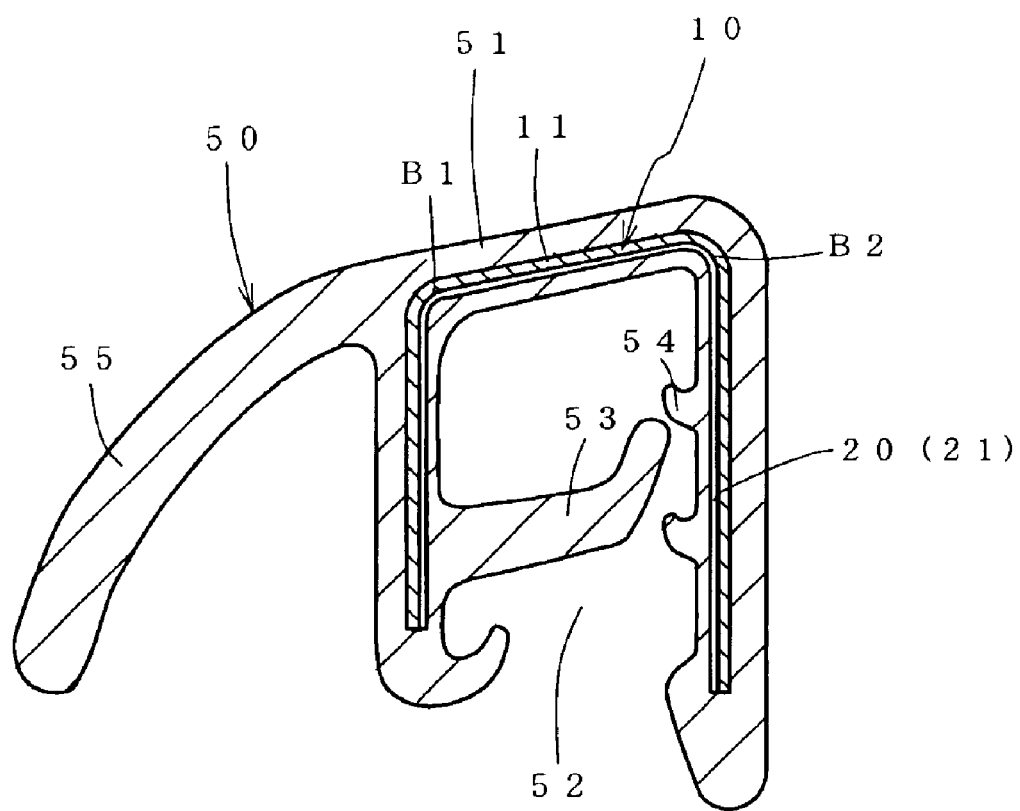
FIG. 26 is a sectional view of a trim in which a trim insert according to the present invention is embedded.
Figure 27:
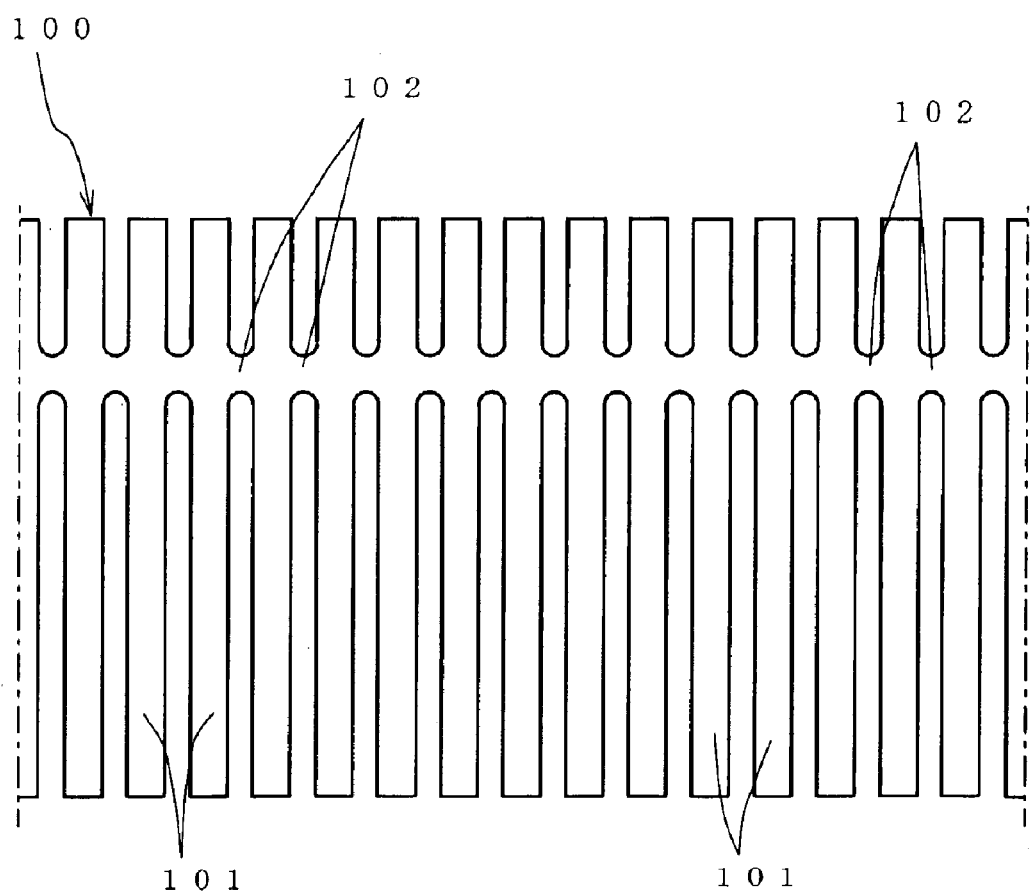
FIG. 27 is a plan view of one embodiment of a conventional trim insert.
Figure 28:
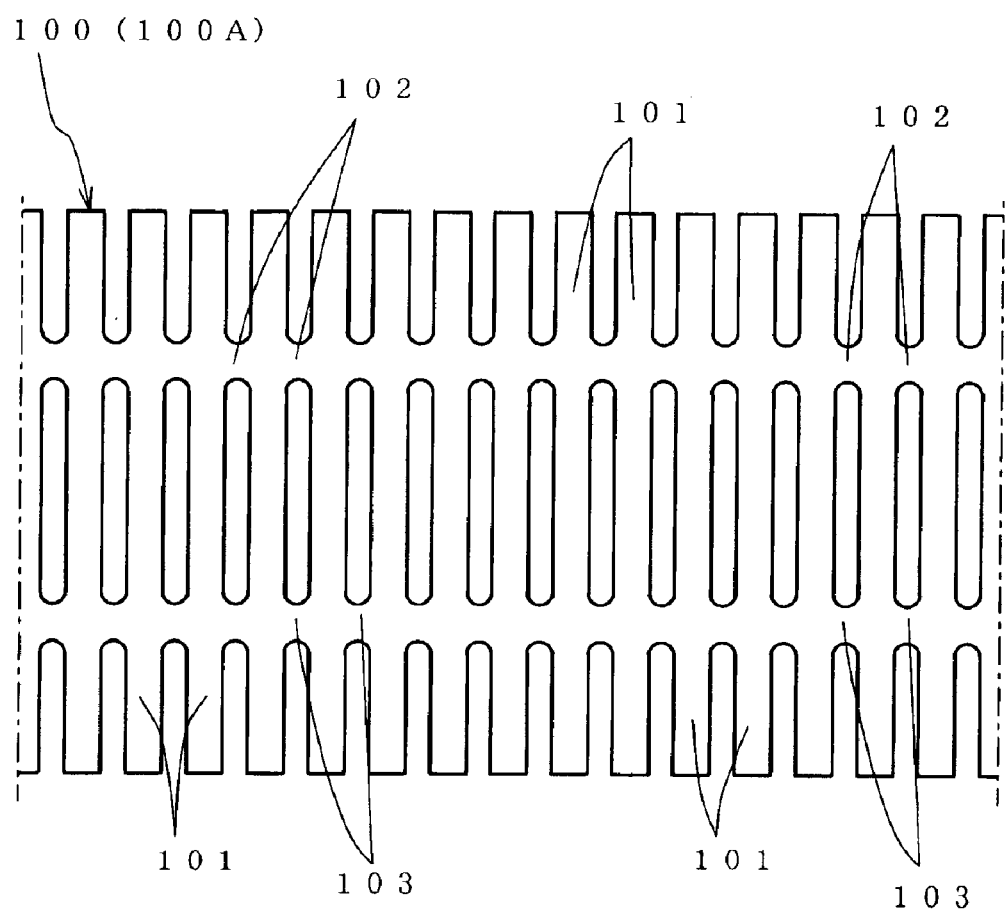
FIG. 28 is a plan view of another embodiment of a conventional trim insert.
Figure 29:
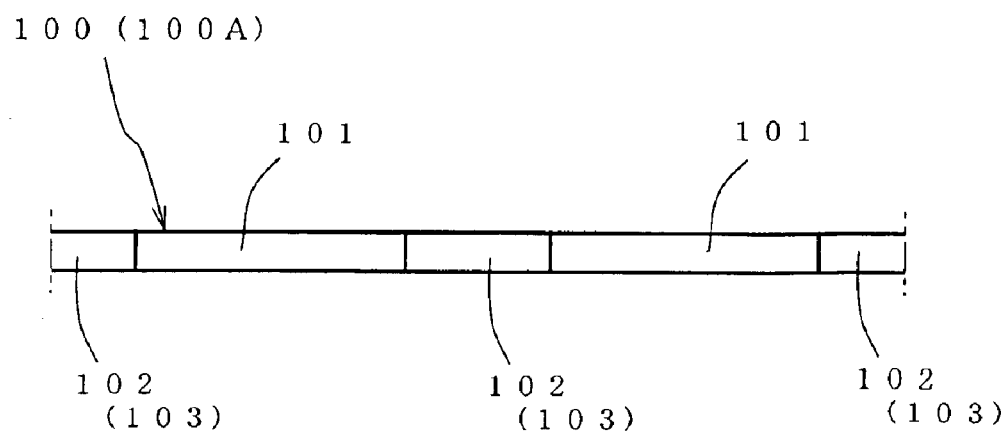
FIG. 29 is an enlarged front view of part of the trim insert shown in FIGS. 27 and 28.

FIG. 1 is a plan view of a part of a trim insert according to one embodiment of the present invention; FIG. 2 is an enlarged front view of the trim insert shown in FIG. 1; FIG. 3 is a perspective view of part of the trim insert of FIG. 1; FIG. 4 is a plan view of another embodiment of the trim insert; FIG. 5 is an enlarged front view of part of a deformed section in the trim insert; FIG. 6 is an enlarged front view of part of another deformed section of the trim insert; FIG. 7 is an enlarged front view of part of another deformed section of the trim insert; FIG. 8 is a plan view of part of one embodiment of the trim insert in which a deformed section is formed in a core piece; and FIG. 9 is an enlarged sectional view illustrating a deformed section of FIG. 8;

FIG. 10 is a plan view of part of a trim insert in which a plurality of deformed sections are formed in every core piece; FIG. 11 is a plan view of part of a trim insert showing another embodiment in which a plurality of deformed sections are formed in every core piece; FIG. 12 is an enlarged sectional view of part of the trim insert shown in FIGS. 10 and 11; FIG. 13 is a plan view of part a trim insert in which a plurality of deformed sections are formed in every core piece; FIG. 14 is a plan view of part of another trim insert in which a plurality of deformed sections are formed in every core piece; FIG. 15 is an enlarged sectional view of part of the deformed section shown in FIGS. 13 and 14; FIG. 16 is a sectional view of part of another trim insert in which a plurality of deformed sections are formed in every core piece; FIG. 17 is a sectional view of part of a further trim insert in which a plurality of deformed sections are formed in every core piece; and FIG. 18 is a partially enlarged sectional view of another trim insert in which a plurality of deformed sections are formed in every core piece;

FIG. 19 is a sectional view of part a trim insert in which a deformed section is formed in a core piece positioned at a predetermined number of the core pieces; FIG. 20 is a sectional view of part of another trim insert in which a deformed section is formed in a core piece positioned at a predetermined number of the core pieces; FIG. 21 is a plan view of a trim insert in which a deformed reinforcement section is formed in the lengthwise direction thereof; FIG. 22 is a sectional view taken along X—X line in FIG. 21; FIG. 23 is a plan view illustrating another embodiment of a trim insert in which deformed reinforcement sections are formed; FIG. 24 is a plan view illustrating another embodiment of a trim insert in which deformed reinforcement sections are formed; FIG. 25 is a plan view illustrating another embodiment of a trim insert in which deformed reinforcement sections as well as opening portions are formed; and FIG. 26 is a sectional view a trim in which a trim insert according to the present invention is embedded;

First, the description will be made on the invention defined by the present invention. A trim insert 10 shown in FIGS. 1 to 3 is made of metal sheet and a plurality of core pieces 11, 11, 11 are arranged parallel to each other at regular intervals and connected to each other via bonding portions 12, 12 to form one piece. Each core piece 11 has a deformed linear section 20 extending in the lengthwise direction a of the core piece 11. The illustrated deformed section 20 is formed all over the surface of a bending portion 21 of the core piece 11 as defined by claim 3.

The trim insert 10 in the embodiment shown in FIG. 1 is continuous in the lengthwise direction b (extending right/ leftward in the drawing), and a length of the core piece 11 (that is, a width of the trim insert 10) is 31.5 mm, a width of the core piece 11 is 2 mm and a distance between the adjacent core pieces 11 (that is, a width of the bonding portion 12) is 1.2 mm. As seen in FIG. 2, 0.4 mm thick sheet metal is bent to have a bending portion 21 of a height c of 0.1 mm in the core piece 11.

It is possible to enhance the rigidity and strength of the core piece 11 by forming the deformed linear section 20 extending in the lengthwise direction a of the core piece 11. While the degree of improvement in rigidity and strength varies in accordance with shapes, sizes, lengths or others of the deformed section 20, the illustrated trim insert 10 has the rigidity and strength favorably comparable with the conventional product, even though the former is made of sheet metal having a thickness of 0.4 mm which is smaller by 0.1 mm than the sheet metal of 0.5 mm thick used for making the conventional product.

The sheet metal forming the trim insert 10 may be an iron sheet, an aluminum sheet, a copper sheet or an alloy sheet such as a stainless steel sheet, which is stamped by a press machine to form the core pieces 11 and the bonding portion 12. The deformed sections 20 may be formed simultaneously with or subsequently to each other in the same press machine.

A trim insert 10A shown in FIG. 4 has two bonding portions 12, 13. One 13 of the bonding portions 12, 13 is smaller in width than the other 12 so that the former is easily broken when the trim insert 10A, molded with a trim to form a molded trim, has been bent. Similarly, a deformed section 20 is formed in the core piece 11, which is a bending portion 21 linearly extending in the lengthwise direction a of the core piece 11.

A trim insert 10B shown in FIG. 5 has a deformed linear section 20 which is a rib 22 (having a circular cross-section) as defined by claim 2. Also, a trim insert 10C shown in FIG. 6 also has a deformed linear section 20 which is a rib 23 (having a trapezoidal cross-section). The ribs 22, 23 have a height of approximately 0.1 mm and a width approximately in a range from 0.3 to 0.5 mm (these values are the same as in the embodiments described later). Further, a trim insert 10D shown in FIG. 7 has a deformed linear section 20 which is a groove 24. The groove 24 has a depth of approximately 0.1 mm and a width in a range from 0.3 to 0.5 mm (these values are the same as in the embodiments described later). These ribs 22, 23 and the groove 24 may be formed on a front surface of the insert as illustrated or on a back surface contrary to the illustrated embodiments. In these drawings, the same reference numerals are used for denoting the same parts (this is also true for the following illustrations).

A trim insert 10E shown in FIG. 8 has a deformed linear section 20 which is formed section of the core piece 11 as defined by claim 4. In this embodiment, the deformed section 20 is a rib 23 (having a trapezoidal cross-section) as shown in FIG. 9, extending generally all over the total length of the core piece 11, except for the opposite ends thereof. In such a manner, the rigidity and the strength of the core piece 11 are adjustable by varying a length and a position of the deformed linear section 20.

FIGS. 10 to 18 illustrate embodiments in which a plurality of deformed sections 20 are formed in the respective core piece 11, as defined by claim 5.

In trim inserts 10F and 10G shown in FIGS. 10 and 11, as shown in a sectional view in FIG. 12, the bending portion 21 formed all over a surface of the core piece 11 partially has a rib 26 projected downward. According to this structure, there is an advantage in that a total height of the core piece 11 is restricted to a suitable limit. In the trim insert 10F, the downward rib 26 is formed at a position in a longer region of the core piece 11 below the bonding portion 12 as seen in the drawing, and in the trim insert 10G, the downward rib 26 is formed at a position of the core piece 11 corresponding to the bonding portion 12.

The trim inserts 10F, 10G shown in FIGS. 10 to 12 and a trim insert 10I shown in FIG. 14 have a plurality of partially formed deformed sections as defined by claim 6. In the trim insert 10F, the bending portion 21 formed all over a surface of the core piece 11 has a downward rib 26 in a longer region of the bonding portion 12 in the core piece 11, and in the trim insert 10G shown in FIG. 11, a downward rib 26 is formed at a position of the core piece 11 corresponding to the bonding portion 12. Further, in the trim insert 100 shown in FIG. 14, a downward rib 26 is formed in a shorter region of the bonding portion 12 in the core piece 11. The positions at which the deformed sections are formed may be suitably changed in accordance with uses and objects of the trim.

Trim inserts 10H and 10I in FIGS. 13 and 14 have a cross-section shown in FIG. 15, in which a groove 24 is partially formed on a concave side 21a of the bending portion 21 defined all over a surface of the core piece 11. In the trim insert 10H shown in FIG. 13, the groove 24 is formed all over the core piece 11 in the lengthwise direction a thereof, and in the trim insert 10I, the groove 24 is formed in a shorter region of the core piece 11 above the bonding portion 12 as seen in the drawing.

FIG. 16 shows a trim insert 10J, in which two ribs 22, 22, which are the deformed linear section 20, are formed along an entire or partial length of the core piece 11. Also, as shown in FIG. 17, a trim insert 10K has a bending portion 21 formed all over a surface of the core piece 11 (or partially thereover) and a rib 22 projected upward from a top of the bending portion 21. Further, a trim insert 10L shown in FIG. 18 has two-stepped rib 27 and 28 in the core piece 11 as the deformed section.

Trim inserts 10M and 10N shown in FIGS. 19 and 20 are as defined by claim 7 and the deformed section 20 is formed in the respective core piece 11 at a predetermined number thereof. In the trim insert 10M shown in FIG. 19, the bending portion 21, which is the deformed section 20, is formed on every other core piece 11. In the trim insert 10N shown in FIG. 20, the deformed section 20 is formed on every other core piece 11 and there are two kinds of the core piece 11 having the deformed section 20 alternated to each other; one solely having the bending portion 21 and the other having a rib 26 further projected downward from the bending portion 21.

Trim inserts 10P, 10R, 10S and 10T shown in FIGS. 21 to 25 are as defined by claim 8 and a deformed reinforcement section 30 continued in the lengthwise direction of the trim inserts 10P, 10R, 10S and 10T at the bonding position of the core piece 11 is provided together with the deformed sections 20. By providing such a deformed reinforcement section 30, the shape-retention ability as an insert as well as the engagement force when attached to a car is favorably improved. In this regard, according to this embodiment, the core piece 11 of each of the trim inserts 10P, 10R, 10S and 10T has a length (that is, a width of the insert) of 31.5 mm, a width of 3 mm and a gap 14 between the adjacent core pieces 11 of 2.5 mm. Although the deformed reinforcement section 30 has the same height as the deformed section 20 as shown in FIG. 22, the height, width and shape are not limited to the illustrated one.

In the trim insert 10R shown in FIG. 23, the deformed section 20R formed in the core piece 11 extends closer to the deformed reinforcement section 30 without crossing the same. According to the deformed section 20R of such a shape, as an end portion of the rib has a larger strength at that corner, the strength and the shape-retention ability of the core piece 11 and the insert in the lengthwise direction thereof are enhanced. Also, it has an effect for preventing an axis of the core piece 11 from deviating from a proper position due to resin pressure during the monolithic molding thereof.

Further, a trim insert 10S shown in FIG. 24 has the deformed reinforcement section 30 crossing the deformed section 20 of the core piece 11 as well as a second deformed reinforcement section 35 at a root of the core piece 11 having a structure generally similar to the former. In the same manner as the above-mentioned deformed section 20R, the second deformed reinforcement section facilitates the strength and the shape-retention ability of the core piece 11 and the insert 10 in the lengthwise direction thereof, as well as prevents the deviation of an axis of the core piece 11 from occurring.

A trim insert 10T shown in FIG. 25 is provided with two bonding portions 12, 13, in the core piece in which the deformed section 20 is formed, in which a deformed reinforcement section 30 extends in the lengthwise direction of the trim insert 10T at the bonding portion 12 positioned on one side of the core piece 11, and a vacant space 40 is formed on the other side of the core piece 11 at a position corresponding to the bonding portion 13. This vacant space 40 lowers the rigidity of this region to facilitate the bending ability and the extensibility of the insert 10T in the lengthwise direction. That is, the insert 10T in this embodiment facilitates the mounting operation thereof to firmly engage the same to a car body by increasing the rigidity of the one side bonding portion 12 and imparting the other side bonding portion 12 with suitable softness due to the effect of the deformed section 20 and the deformed reinforcement section 30. In this regard, by providing the other side bonding portion 13, it is also possible to prevent the deviation of an axis of the core piece 11 from occurring during the molding process.

FIG. 26 relates to the invention defined by claim 11 and illustrates a sectional view of one embodiment of a trim 30 in which the trim insert 10 (10A to 10T) is embedded as an integral body. The illustrated trim 30 relates to the weather strip for a car described before, in which trim insert 10 of a sheet metal, including a plurality of core pieces 11 arranged parallel to each other at a predetermined pitch and are connected with each other via bonding portions 12 (not shown), is embedded in a mold body 31 of rubber or synthetic resin. The trim insert 10 has a deformed linear section 20 extending in the lengthwise direction of the core piece 11. Also the trim insert 10 is bent in the trim inserts 10 in conformity with the trim body. Reference numerals B1 and B2 in the drawing represent the bending portions of the core pieces 11.

The trim body 51 is an extrusion-molded product of rubber or synthetic resin such as EPDM (ethylene propylene dien terpolymer) and, during the extrusion-molding of the trim body 51, a flat sheet of the trim insert 10 is fed thereto to form a monolithic molded product which is then bent by a bending machine or others to have the predetermined shape as shown in FIG. 26. In FIG. 26, reference numerals 52 denotes an engagement portion to be mounted to a flange formed in a door opening of a car; 53 and 54 denotes lips thereof; and 55 denotes a seal portion to be elastically in contact with a door panel for the purpose of absorbing a shock between the door panel and the door opening as well as sealing between the two.

As illustrated in the drawings and described above, according to the trim insert of the present invention, as the deformed linear section is formed in the core piece in the lengthwise direction, it is possible to readily facilitate the rigidity and strength of the core piece. Therefore, it is possible to reduce a thickness of the insert without deteriorating the function thereof, thereby the material cost becomes lower and the weight is less. Particularly, as an insert of this kind is embedded in a long molded section all over the entire length thereof, the above-mentioned advantage is extremely favorable. In addition, material resources are effectively used.

According to the trim insert of the present invention, it is possible to adjust or regulate the function of the core piece and the trim insert, if necessary, in accordance with shapes, sizes or positions of the deformed section formed in the core piece.

As the trim using the trim insert according to the present invention is improved in rigidity and strength due to the deformed section formed in the core piece of the trim insert, it is possible to facilitate the shape-retention ability as a trim or the engagement force in the mounting portion. Also, since the thickness of the sheet metal can be reduced in comparison with the conventional trim insert, the present invention is advantageous in cost and weight reduction of the product. Further, since the function of the core piece and the trim insert is adjustable by the shape, size and position of the deformed section in the core piece, there is an advantage in that a trim having a suitable function can be produced.

What is claimed is:

1. A trim insert made of metal sheet in which a plurality of core pieces arranged parallel to each other and at regular intervals are connected together via bonded portions, characterized in that a deformed linear section is formed in the lengthwise direction of the core piece wherein the deformed section is formed entirely over a surface of each one of the respective core pieces.

2. A trim insert as defined by claim 1, wherein the deformed section is a bent portion, or a groove portion.

3. A trim insert defined by claim 1, wherein the deformed section is formed in each of the core pieces.

4. A trim in which an insert of metal sheet is formed of a plurality of core pieces arranged parallel to each other and at regular intervals and connected to each other via bonded portions are embedded in a main body of rubber or synthetic resin, characterized in that the trim insert has a deformed linear section entirely in the lengthwise direction of the core piece, and in that the trim insert is bent along a shape of the trim body in the core piece, wherein each deformed linear section being configured in cross-section in an arcuate shape arcing completely between and from consecutive ones of the bonded portions in a widthwise direction.

5. A trim insert made of metal sheet in which a plurality of core pieces arranged parallel to each other and at regular intervals are connected together via bonded portions, characterized in that a deformed linear section is formed entirely in the lengthwise direction of the core piece with each deformed linear section being configured in cross-section in an arcuate shape arcing completely between and from consecutive ones of the bonded portions in a widthwise direction.

* * * * *